United States Patent
Ishida et al.

(10) Patent No.: US 11,163,996 B2
(45) Date of Patent: Nov. 2, 2021

(54) VEGETATION INDEX CALCULATION APPARATUS, VEGETATION INDEX CALCULATION METHOD, AND COMPUTER READABLE RECORDING MEDIUM

(71) Applicant: NEC Corporation, Tokyo (JP)

(72) Inventors: Kousuke Ishida, Tokyo (JP); Hajime Ishikawa, Tokyo (JP); Shinji Oominato, Tokyo (JP); Shunsuke Akimoto, Tokyo (JP); Masami Sakaguchi, Tokyo (JP); Shintaro Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 16/494,117

(22) PCT Filed: Feb. 16, 2018

(86) PCT No.: PCT/JP2018/005579
§ 371 (c)(1),
(2) Date: Sep. 13, 2019

(87) PCT Pub. No.: WO2018/173577
PCT Pub. Date: Sep. 27, 2018

(65) Prior Publication Data
US 2021/0142056 A1    May 13, 2021

(30) Foreign Application Priority Data
Mar. 23, 2017   (JP) .............................. JP2017-057781

(51) Int. Cl.
G06K 9/00     (2006.01)
G06K 9/62     (2006.01)
G06K 9/66     (2006.01)

(52) U.S. Cl.
CPC ....... *G06K 9/00657* (2013.01); *G06K 9/6269* (2013.01); *G06K 9/66* (2013.01)

(58) Field of Classification Search
CPC ..... G06K 9/00657; G06K 9/6269; G06K 9/66
(Continued)

(56) References Cited

U.S. PATENT DOCUMENTS

2013/0235183 A1*  9/2013  Redden ................... A01G 7/00
                                                         348/89
2015/0206255 A1   7/2015  Groeneveld
(Continued)

FOREIGN PATENT DOCUMENTS

JP    2003-009664 A    1/2003
JP    2006-085517 A    3/2006
(Continued)

OTHER PUBLICATIONS

Kageyama Yoichi, et al., "Algorithm for Estimating Ratio of Harmful Vegetation to Manage River Bank", Journal of Electronics, Information Communication Engineers, Japan, General Incorporated Electronic Information Communication Engineers, Apr. 1, 2012, vol. J95-D, No. 4, pp. 1056-1060 (5 pages).
(Continued)

*Primary Examiner* — Michael R Neff

(57) ABSTRACT

A vegetation index calculation apparatus (10) is provided with a learning model generation unit (11) that generates a learning model, by using an image of a crop targeted for calculation of a vegetation index and an image of plants other than the crop to learn a feature amount of the image of the crop, an image acquisition unit (12) that acquires an aerial image of a target region where the crop is being grown, a specification unit (13) that applies the aerial image acquired by the image acquisition unit (12) to the learning model generated by the learning model generation unit (11),
(Continued)

and specifies the image of the crop in the aerial image acquired by the image acquisition unit (12), and a vegetation index calculation unit (14) that calculates the vegetation index of the crop, using the image of the crop specified by the specification unit (13).

10 Claims, 9 Drawing Sheets

(58) Field of Classification Search
USPC .......................................................... 382/110
See application file for complete search history.

(56) References Cited

U.S. PATENT DOCUMENTS

| | | | |
|---|---|---|---|
| 2015/0254800 A1 | 9/2015 | Johnson et al. | |
| 2016/0148104 A1* | 5/2016 | Itzhaky | G06K 9/6272 |
| | | | 706/12 |
| 2016/0379369 A1 | 12/2016 | Sugaya | |
| 2017/0250751 A1* | 8/2017 | Kargieman | G06K 9/46 |

FOREIGN PATENT DOCUMENTS

| | | |
|---|---|---|
| JP | 2008-152425 A | 7/2008 |
| JP | 2012-208839 A | 10/2012 |
| JP | 2014-191624 A | 10/2014 |
| JP | 2015-099616 A | 5/2015 |
| JP | 2015-188333 A | 11/2015 |
| JP | 2016-168046 A | 9/2016 |
| JP | 2017-016271 A | 1/2017 |

OTHER PUBLICATIONS

Japanese Notice of Reasons for Refusal issued in Japanese Patent Application No. 2019-507446, dated Jul. 30, 2019, 6 pages.
Extended European Search Report issued in European Patent Application No. 18772317.6, dated Feb. 27, 2020, 12 pages.
Suhas S. Athani, et al. "Support Vector Machine-Based Classification Scheme of Maize Crop", 2017 IEEE 7th International Advance Computing Conference (IACC), XP033118454, pp. 84-88 (5 pages).
Citro Potena, et al. "Fast and Accurate Crop and Weed Identification with Summarized Train Sets for Precision Agriculture", Advances in Intelligent Systems and Computing: AISC, XP055653682, Jan. 1, 2017. pages 1-17 (17 pages).
International Search Report corresponding to PCT/JP2018/005579 dated May 1, 2018 (one page).

* cited by examiner

VEGETATION INDEX CALCULATION APPARATUS, VEGETATION INDEX CALCULATION METHOD, AND COMPUTER READABLE RECORDING MEDIUM

TECHNICAL FIELD

The present invention relates to a vegetation index calculation apparatus and a vegetation index calculation method that are for calculating a vegetation index of plants, and, furthermore, to a computer readable recording medium that includes a program for realizing the apparatus and method recorded thereon.

BACKGROUND ART

In recent years, efforts have been made to predict crop yields by computer simulation following advances in computers. For example, Patent Document 1 proposes a system that predicts crop yields by ascertaining the growth condition of crops in a field.

Specifically, the system disclosed in Patent Document 1, first, calculates a vegetation index of the crop and an effective cumulative temperature, for every period, for a specific field (or area), based on satellite data and meteorological data, and generates a growth curve of the crop up to the present time using the calculated data. Next, the system disclosed in Patent Document 1 generates a statistical model using the obtained growth curve, and predicts a future growth curve using the generated statistical model.

Also, in such a system, the accuracy of the vegetation index of the crop is important. An example of a known vegetation index is NDVI (Normalized Difference Vegetation Index). NDVI is an index that utilizes the characteristics of plant leaves absorbing blue and red wavelengths and strongly reflecting wavelengths in the near-infrared region, and indicates the distribution and activity of vegetation. The tendency is for vegetation to be thicker as the value of NDVI becomes a larger positive value.

LIST OF RELATED ART DOCUMENTS

Patent Document

Patent Document 1: Japanese Patent Laid-Open Publication No. 2015-188333

SUMMARY OF INVENTION

Problems to be Solved by the Invention

Incidentally, NDVI is calculated by normalizing a value obtained by (IR−R)/(IR+R) between −1 and +1, where R is the reflectance of the red visible region obtained from satellite data, and IR is the reflectance of the near-infrared region obtained from satellite data. In other words, NDVI is calculated from data obtained by satellite.

However, since plants other than the crop, such as weeds, for example, also proliferate in an actual field, NVDI is a value that includes weed vegetation. Thus, the reliability of NDVI may be low, and in such cases, the predictive accuracy of crop yields drops markedly.

An example object of the invention is to provide a vegetation index calculation apparatus, a vegetation index calculation method and a computer readable recording medium that solve the above problems and can accurately calculate a vegetation index of a targeted crop in a specific field or area.

Means for Solving the Problems

A first vegetation index calculation apparatus according to an example aspect of the invention includes:
a learning model generation unit configured to generate a learning model, by using an image of a crop targeted for calculation of a vegetation index and an image of plants other than the crop to learn a feature amount of the image of the crop;
an image acquisition unit configured to acquire an aerial image of a target region where the crop is being grown;
a specification unit configured to apply the aerial image acquired by the image acquisition unit to the learning model generated by the learning model generation unit, and specify the image of the crop in the aerial image acquired by the image acquisition unit; and
a vegetation index calculation unit configured to calculate the vegetation index of the crop, using the image of the crop specified by the specification unit.

A second vegetation index calculation apparatus according to an example aspect of the invention includes:
a learning model generation unit configured to generate a learning model, by using an image of a crop targeted for calculation of a vegetation index and an image of plants other than the crop to learn a feature amount of the image of the plants other than the crop;
an image acquisition unit configured to acquire an aerial image of a target region where the crop is being grown;
a specification unit configured to apply the aerial image acquired by the image acquisition unit to the learning model generated by the learning model generation unit, and specify the image of the plants other than the crop in the aerial image acquired by the image acquisition unit;
a vegetation index calculation unit configured to calculate a first vegetation index using the aerial image, and calculate a second vegetation index using the image of the plants other than the crop specified by the specification unit; and a vegetation index correction unit configured to calculate the vegetation index of the crop, by correcting the first vegetation index with the second vegetation index.

A first vegetation index calculation method according to an example aspect of the invention includes:
(a) a step of generating a learning model, by using an image of a crop targeted for calculation of a vegetation index and an image of plants other than the crop to learn a feature amount of the image of the crop;
(b) a step of acquiring an aerial image of a target region where the crop is being grown;
(c) a step of applying the aerial image acquired in the (b) step to the learning model generated in the (a) step, and specifying the image of the crop in the aerial image acquired in the (b) step; and
(d) a step of calculating the vegetation index of the crop, using the image of the crop specified in the (c) step.

Also, a second vegetation index calculation method according to an example aspect of the invention includes:
(a) a step of generating a learning model, by using an image of a crop targeted for calculation of a vegetation index and an image of plants other than the crop to learn a feature amount of the image of the plants other than the crop;
(b) a step of acquiring an aerial image of a target region where the crop is being grown;

(c) a step of applying the aerial image acquired in the (b) step to the learning model generated in the (a) step, and specifying the image of the plants other than the crop in the aerial image acquired in the (b) step;

(d) a step of calculating a first vegetation index using the aerial image, and calculating a second vegetation index using the image of the plants other than the crop specified in the (c) step; and (e) a step of calculating the vegetation index of the crop, by correcting the first vegetation index with the second vegetation index.

Furthermore, a first computer readable recording medium according to an example aspect of the invention includes a program recorded thereon, the program including instructions that cause a computer to carry out:

(a) a step of generating a learning model, by using an image of a crop targeted for calculation of a vegetation index and an image of plants other than the crop to learn a feature amount of the image of the crop;

(b) a step of acquiring an aerial image of a target region where the crop is being grown;

(c) a step of applying the aerial image acquired in the (b) step to the learning model generated in the (a) step, and specifying the image of the crop in the aerial image acquired in the (b) step; and (d) a step of calculating the vegetation index of the crop, using the image of the crop specified in the (c) step.

Furthermore, a second computer readable recording medium according to an example aspect of the invention includes a program recorded thereon, the program including instructions that cause a computer to carry out:

(a) a step of generating a learning model, by using an image of a crop targeted for calculation of a vegetation index and an image of plants other than the crop to learn a feature amount of the image of the plants other than the crop;

(b) a step of acquiring an aerial image of a target region where the crop is being grown;

(c) a step of applying the aerial image acquired in the (b) step to the learning model generated in the (a) step, and specifying the image of the plants other than the crop in the aerial image acquired in the (b) step;

(d) a step of calculating a first vegetation index using the aerial image, and calculating a second vegetation index using the image of the plants other than the crop specified in the (c) step; and (e) a step of calculating the vegetation index of the crop, by correcting the first vegetation index with the second vegetation index.

Advantageous Effects of the Invention

As described above, according to the invention, a vegetation index of a targeted crop can be accurately calculated in a specific field or area.

EXAMPLE EMBODIMENTS

First Example Embodiment

Hereinafter, a vegetation index calculation apparatus, a vegetation index calculation method and a program in a first example embodiment of the invention will be described, with reference to FIGS. 1 to 6.

(Apparatus Configuration)

Figure 1:
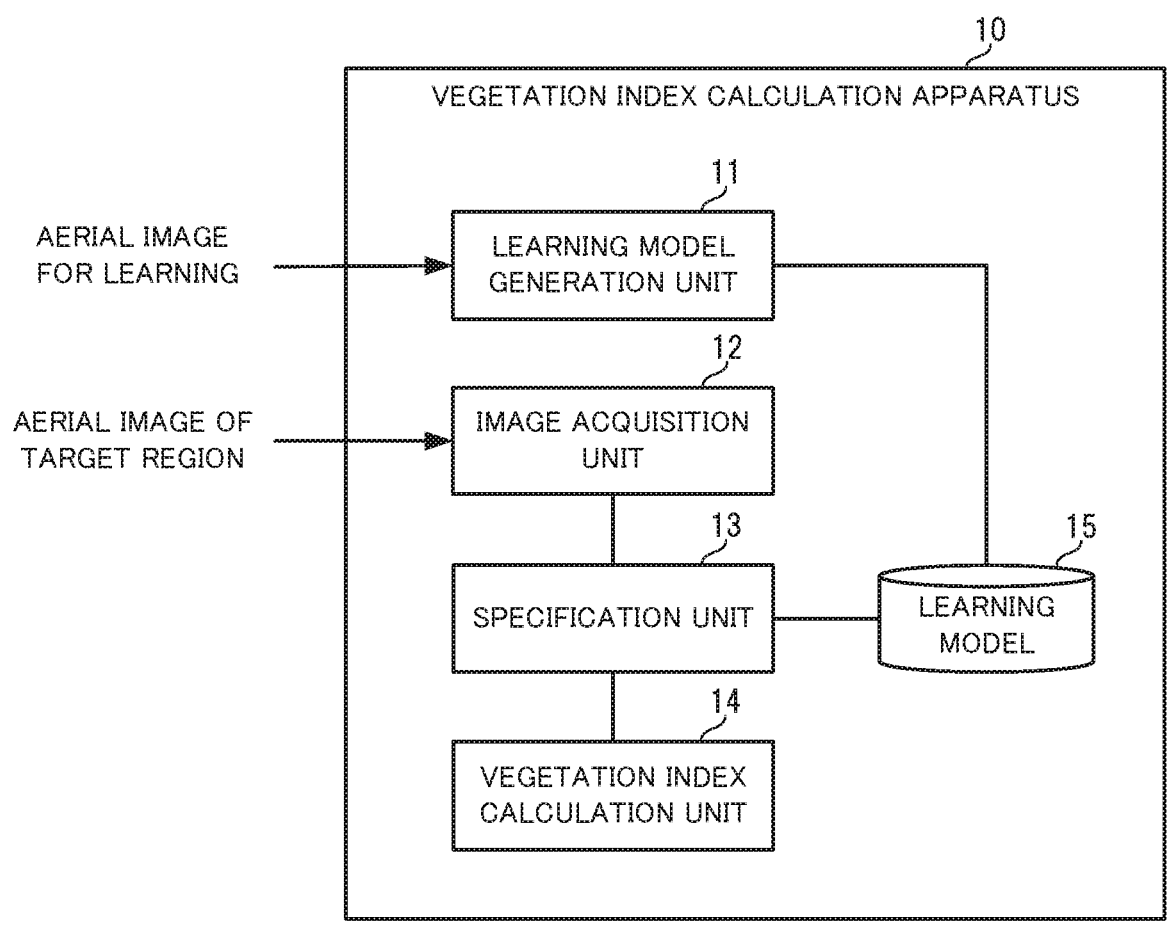
FIG. 1 is a block diagram showing the configuration of a vegetation index calculation apparatus in a first example embodiment of the invention.

Initially, the configuration of the vegetation index calculation apparatus in the first example embodiment will be described using FIG. 1. FIG. 1 is a block diagram showing the configuration of the vegetation index calculation apparatus in the first example embodiment of the invention.

A vegetation index calculation apparatus 10 shown in FIG. 1 is an apparatus for calculating a vegetation index of a target region, such as a specific field or area, for example. As shown in FIG. 1, the vegetation index calculation apparatus 10 is provided with a learning model generation unit 11, an image acquisition unit 12, a specification unit 13, and a vegetation index calculation unit 14.

The learning model generation unit 11 generates a learning model 15 by using the image of a crop (hereinafter, simply "crop") targeted for calculation of a vegetation index and an image of plants other than the crop (hereinafter, simply "plants") to learn the feature amount of the image of the crop.

Here, the image of the crop and the image of the plants can be aerial images of the crop and plants taken from the sky, for example. As described later, since the image applied to the learning model 15 is an aerial image, the image that the learning model generation unit 11 uses in generation of the learning model 15 is also preferably an aerial image.

The aerial image taken of the crop and the plants from the sky is obtained by shooting a field from the sky using a satellite, a plane or a drone or the like, for example. In the case of using an aerial image obtained by shooting a field from the sky using a satellite, a plane, a drone or the like, at the time of generating the learning model 15, one aerial image may contain an image of the crop and an image of the plants. In the case where one aerial image contains an image of the crop and an image of the plants, the image of the crop and image of the plants can be respectively clipped from the aerial image, and used in generating the learning model 15.

Note that the accuracy of the learning model improves as a result of performing learning using "an image of the crop" and "an image containing an image of the crop and an image of plants other than the crop". Taking the case where the plants other than the crop are weeds as an example, the weeds are often mixed in with the crop in an actual field. Also, since the type of weeds is not limited to one type, the shape of the leaf of the weeds, for example, may conceivably take various shapes when viewed from the sky, such as being pointy or round.

Accordingly, performing learning by acquiring a large number of "images of the crop" and "images containing an image of the crop and an image of the weeds" enables a learning model that more closely approximates the actual case to be generated. Furthermore, since the weeds could conceivably exist independently, a learning model that even more closely approximates the actual case can be generated by performing learning using "images of the crop", "images containing an image of the crop and an image of the weeds", and "images of the weeds".

The image acquisition unit 12 acquires an aerial image of a target region where the crop is being grown. The image acquisition unit 12 acquires an aerial image of a field or the like taken from the sky by a satellite, a plane, a drone or the like, for example.

The specification unit 13, by applying the aerial image acquired by the image acquisition unit 12 to the learning model 15 generated by the learning model generation unit 11, specifies an image of the crop in this aerial image.

The vegetation index calculation unit 14 calculates a vegetation index of the crop in the target region, using the image of the crop specified by the specification unit 13.

In this way, in the first example embodiment, the learning model generation unit 11 generates a learning model 15 that is able to specify an image of the crop, by learning a feature amount of the image of the crop, thus enabling an image of the crop to be accurately specified from an aerial image. Thus, according to the first example embodiment, a vegetation index of a targeted crop can be accurately calculated in a specific field or area.

Figure 2:
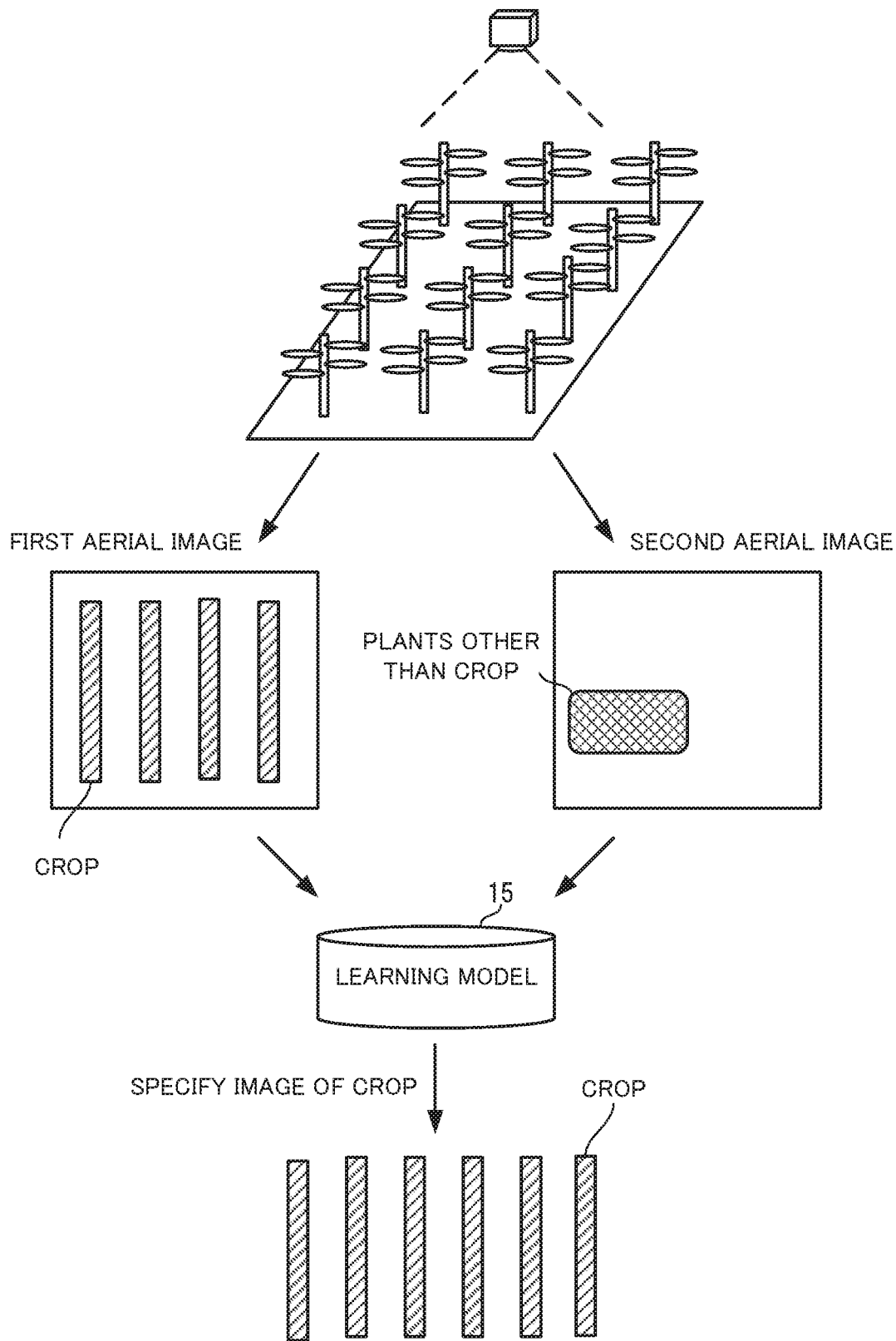
FIG. 2 illustrates processing for generating a learning model in the first example embodiment of the invention.
Figure 3:
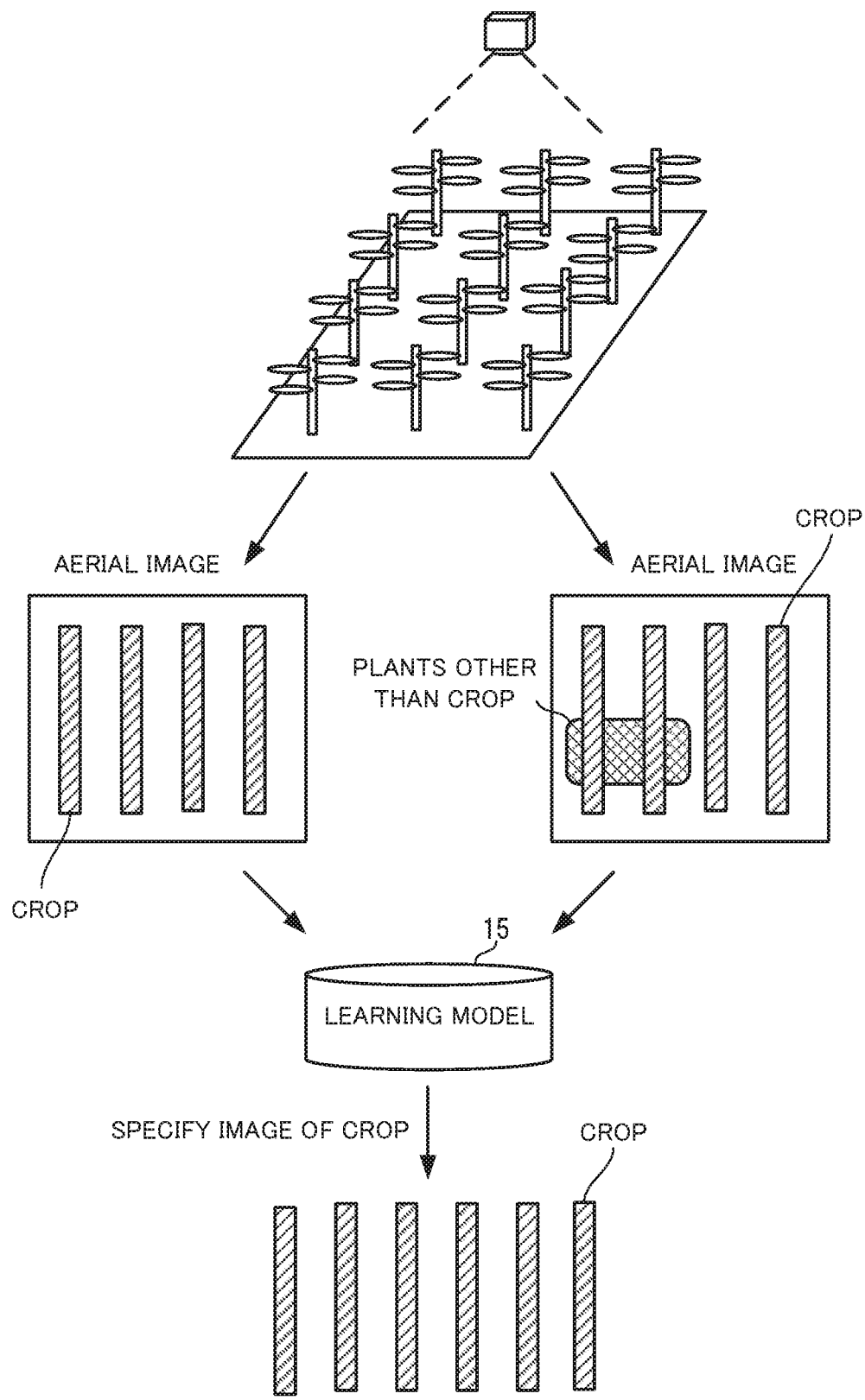
FIG. 3 illustrates another example of processing for generating a learning model in the first example embodiment of the invention.

Next, the configuration of the vegetation index calculation apparatus 10 in the first example embodiment will be more specifically described, using FIGS. 2 and 3. FIG. 2 illustrates processing for generating a learning model in the first example embodiment of the invention. FIG. 2 describes an example using an aerial image of a field or the like as the image that is used in generating a learning model.

As shown in FIG. 2, first, an image of a field or the like is taken from the sky by a satellite, a plane, a drone or the like, and an aerial image for learning is obtained. The learning model generation unit 11 extracts feature amounts indicating shape, color and position in the region in which the crop exists and the region in which plants other than the crop exist from this aerial image for learning. The learning model creation unit 11 then learns the feature amounts indicating shape, color and position, using a support vector machine, and generates a learning model indicating the learning result.

Specifically, the learning model generation unit 11, as shown in FIG. 2, acquires an image of the crop targeted for calculation of a vegetation index taken from the sky within the acquired aerial image for learning as a first aerial image. Also, the learning model generation unit 11 acquires an image of plants other than the crop taken from the sky as a second aerial image. Note that, in the case where an aerial image obtained by photography contains both an image of the crop and an image of plants other than the crop, the first aerial image and the second aerial image may be created by processing the image. Also, although the number of first aerial images and second aerial images that are acquired is not limited, the largest possible number is desirable in terms of the determination accuracy of the learning model.

Next, the learning model generation unit 11 extracts feature amounts indicating shape, color and position of the region where the crop exists from the first aerial image. Furthermore, the learning model generation unit 11 extracts feature amounts indicating shape, color and position of the region where plants other than the crop exist from the second aerial image. The learning model generation unit 11 then classifies and holds the feature amounts obtained from the first aerial image and the feature amounts obtained from the second aerial image.

Note that the shape of the region where the crop exists includes shapes particular to the targeted crop, such as the shape of furrows, for example. Also, the shapes particular to the crop refers to particular shapes when that crop is seen from above, which are determined by the leaf shape of the crop and how the leaves overlap. Furthermore, the position where the crop exists includes the state in which the furrows are arranged. Also, the color of the region where the crop exists includes frequency characteristics (color components including infrared and ultraviolet) in that region, which are determined by the color of the crop.

Also, the shape of the region where plants other than the crop exist includes shapes particular to the plants other than the crop. Furthermore, the shapes particular of the plants other than the crop also refer to particular shapes when the plants are seen from above, which are determined by the leaf shape of those plants and how the leaves overlap. Additionally, the color of the region where the plants other than the crop exist includes frequency characteristics (color components including infrared and ultraviolet) in that region, which are determined by the color of the plants.

Next, the learning model generation unit 11 learns the feature amounts indicating shape, color and position of the region where the crop targeted for calculation of a vegetation index exists, using the support vector machine. Specifically, the learning model generation unit 11 causes the support vector machine to learn the boundary between the crop targeted for calculation of a vegetation index and the plants other than the crop, by providing the feature amounts of the classified aerial images thereto, and generates a learning model 15 indicating the learning result.

The learning model generation unit 11 is also able to perform deep learning, using the large number of aerial images for learning that were acquired, create a classifier that identifies images of the crop taken from the sky and the images of the plants other than the crop taken from the sky, and sets the created classifier as the learning model 15.

The specification unit 13 specifies images of the crop from the aerial images acquired by the image acquisition unit 12, using the learning model 15 generated by the learning model generation unit 11. Here, the aerial images that are acquired by the image acquisition unit 12 are also obtained by taking images of a field or the like from the sky using a satellite, a plane, a drone or the like, similarly to the aerial images (refer to FIG. 2) that are used in learning.

The index calculation unit 14 calculates a vegetation index of the crop in the target region, using the images specified by the specification unit 13. SAVI (Soil Adjusted Vegetation Index), WDVI (Weighted Difference Vegetation Index, and NDRE (Normalized Difference Red Edge) are given as examples of the vegetation index that is calculated in the first example embodiment, in addition to NDVI mentioned in the Background Art.

SAVI is an index obtained by taking the effects of reflection of the background soil into account in NDVI. WDVI is a weighted difference vegetation index, and is calculated by weighting each band of reflected light from a plant with the value of soil taken as 0. NDRE is an index obtained by normalizing values measured in a Red Edge band (near a wavelength of 710 nm) by RapidEye satellites.

FIG. 3 illustrates another example of processing for generating a learning model in the first example embodiment of the invention. In the example in FIG. 3, the learning model generation unit 11 performs learning by deep learning, using "images of the crop" and "images containing an image of the crop and an image of plants other than the crop". As mentioned previously, the accuracy of the learning model improves as a result of performing learning using "images of the crop" and "images containing an image of the crop and an image of plants other than the crop".

(Apparatus Operations)

Next, operations of the vegetation index calculation apparatus 10 in the first example embodiment of the invention will be described using FIGS. 4 to 6. Also, in the first example embodiment, a vegetation index calculation method is implemented by operating the vegetation index calculation apparatus 10. Therefore, description of the vegetation index calculation method in the first example embodiment will be replaced by the following description of the operations of the vegetation index calculation apparatus.

Initially, the processing for generating a learning model will be described using FIGS. 4 and 5. First, the case where a learning model is generated by the support vector machine will be described using FIG. 4. FIG. 4 is a flowchart showing operations at the time of learning model generation processing by the support vector machine of the vegetation index calculation apparatus in the first example embodiment of the invention.

Figure 4:
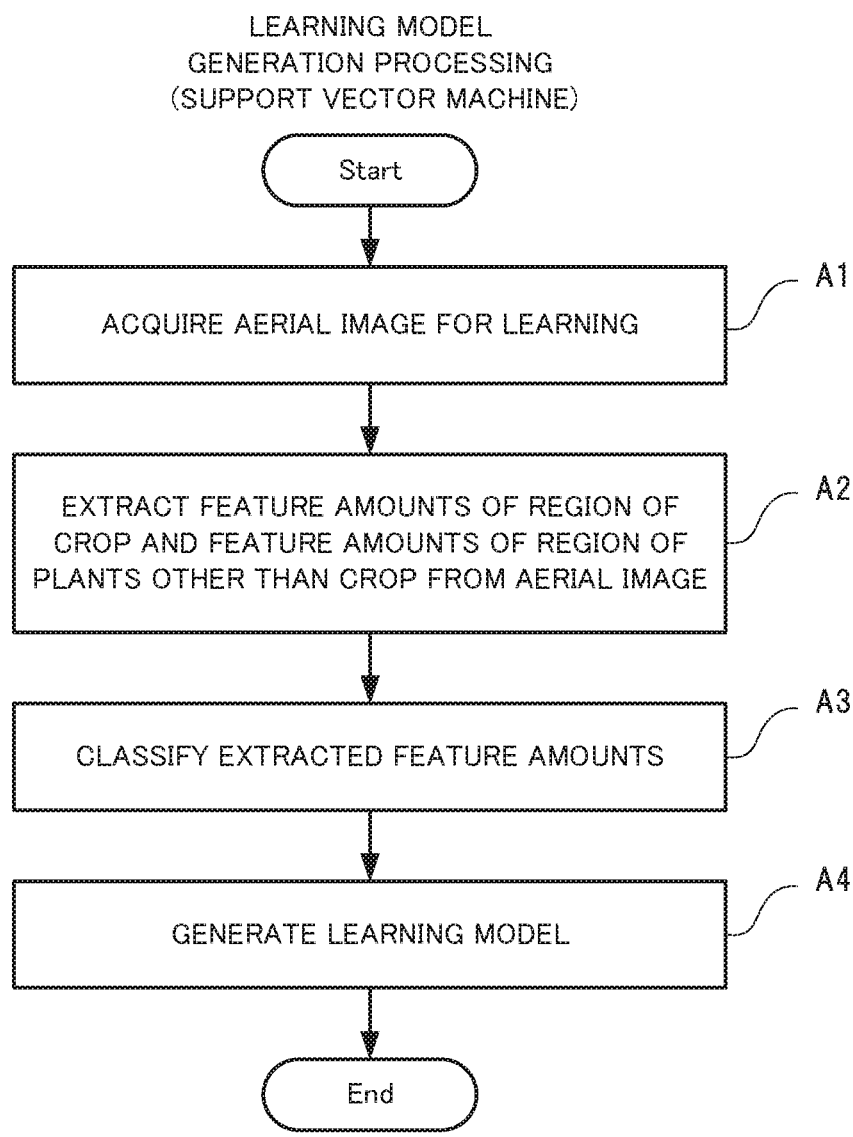
FIG. 4 is a flowchart showing operations at the time of learning model generation processing by a support vector machine of the vegetation index calculation apparatus in the first example embodiment of the invention.

As shown in FIG. 4, the learning model generation unit 11 acquires a large number of aerial images from an external source (step A1). The acquired aerial images include first aerial images and second aerial images. The first aerial images and second aerial images are as described above.

Next, the learning model generation unit 11 extracts feature amounts indicating shape, color and position of the region where the crop exist from the first aerial images, and extracts feature amounts indicating shape, color and position of the region where the plants other than the crop exist from the second aerial images (step A2).

Next, the learning model generation unit 11 classifies and holds the feature amounts obtained from the first aerial images and the feature amounts obtained from the second aerial images (step A3).

Next, the learning model generation unit 11 learns the feature amounts indicating shape, color and position of the region where the crop targeted for calculation of a vegetation index exists, using the support vector machine, and generates a learning model 15 (step A4).

Specifically, the learning model generation unit 11 provides the feature amounts of each of the classified aerial images to the support vector machine to cause the support vector machine to learn the boundary between the crop targeted for calculation of a vegetation index and the plants other than the crop, and generates a learning model 15 indicating the learning results.

Next, the case where a learning model is generated by deep learning will be described using FIG. 5. FIG. 5 is a flowchart showing operations at the time of learning model generation processing by deep learning of the vegetation index calculation apparatus in the first example embodiment of the invention.

Figure 5:
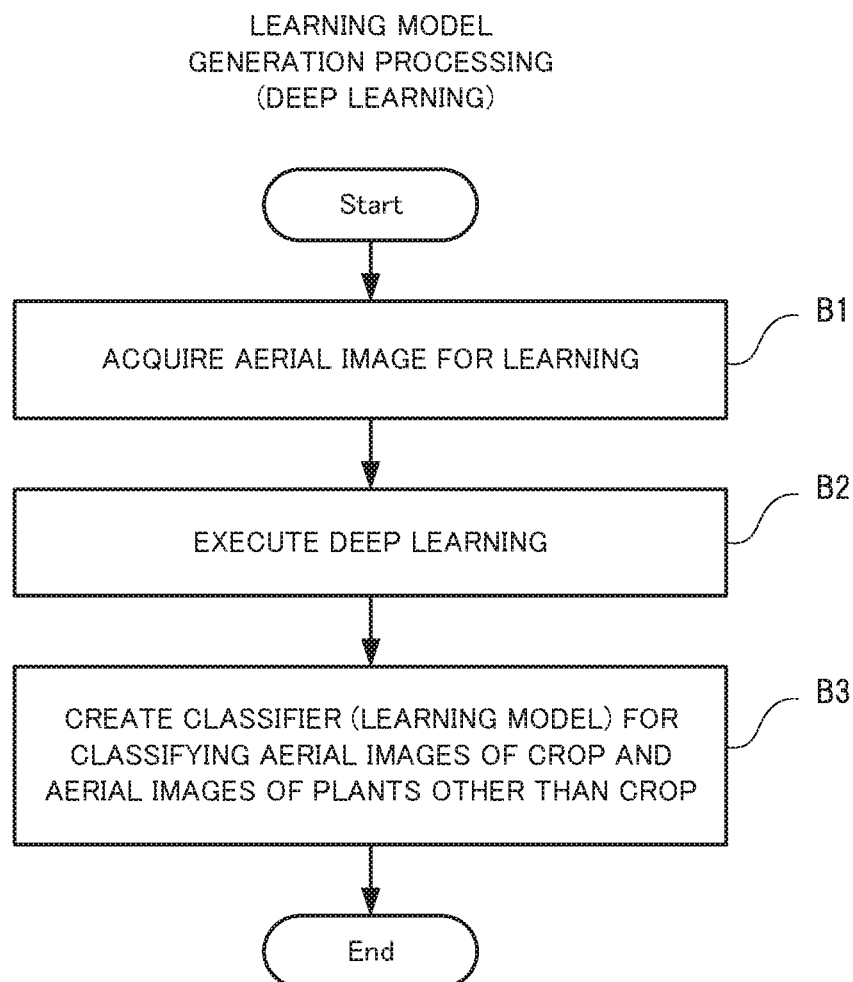
FIG. 5 is a flowchart showing operations at the time of learning model generation processing by deep learning of the vegetation index calculation apparatus in the first example embodiment of the invention.

As shown in FIG. 5, the learning model generation unit 11 acquires a large number of aerial images from an external source (step B1). The aerial images include "images of the crop" and "images containing an image of the crop and an image of plants other than the crop", for example.

Next, the learning model generation unit 11 executes deep learning, using the large number of aerial images for learning acquired in step B1 (step B2).

The learning model generation unit 11 then creates a classifier for identifying images of the crop targeted for calculation of a vegetation index taken from the sky and images of the plants other than the crop taken from the sky from the result of step B2, and sets the created classifier as the learning model 15 (step B3).

Next, processing for calculating a vegetation index will be described using FIG. 6. FIG. 6 is a flowchart showing operations at the time of vegetation index calculation processing of the vegetation index calculation apparatus in the first example embodiment of the invention.

Figure 6:
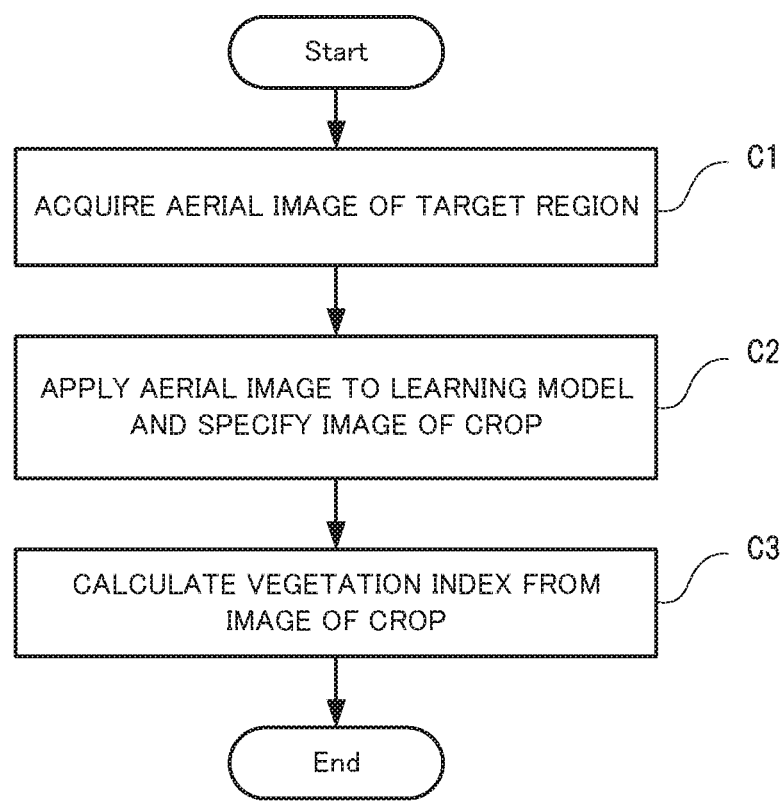
FIG. 6 is a flowchart showing operations at the time of vegetation index calculation processing of the vegetation index calculation apparatus in the first example embodiment of the invention.

As shown in FIG. 6, initially, the image acquisition unit 12 acquires an aerial image of the target region where the crop is being grown (step C1).

Next, the specification unit 13 applies the aerial image acquired by the image acquisition unit 12 in step C1 to the learning model 15, and specifies an image of the crop in this aerial image (step C2).

Next, the vegetation index calculation unit 14 calculates a vegetation index of the crop in a target region, such as NDVI, for example, using the image of the crop specified by the specification unit 13 in step C2 (step C3). Also, the vegetation index calculation unit 14 transmits the calculated vegetation index to an external terminal unit or the like.

As described above, by executing steps A1 to A4 shown in FIG. 4 or steps B1 to B3 shown in FIG. 5, the learning model generation unit 11 learns feature amounts of images of the crop targeted for calculation of a vegetation index, and generates a learning model 15 that is able to specify an image of the crop. The specification unit 13 is able to specify an image of the crop in that field or area, by applying an aerial image of the target field or area to this learning model 15. The vegetation index calculation unit 14 then calculates a vegetation index of the crop, using the image of the crop specified by the specification unit 13. Thus, according to the first example embodiment, a vegetation index of a targeted crop can be accurately calculated in a specific field or area.

(Program)

The program in the first example embodiment need only be a program that causes a computer to execute steps A1 to A4 shown in FIG. 4 (or steps B1 to B3 shown in FIG. 5) and steps C1 to C3 shown in FIG. 6. The vegetation index calculation apparatus 10 and the vegetation index calculation method in the first example embodiment can be realized, by this program being installed on a computer and executed. In this case, a processor of the computer functions and performs processing as the learning model generation unit 11, the image acquisition unit 12, the specification unit 13 and the vegetation index calculation unit 14.

Also, the program in the first example embodiment may be executed by a computer system built with a plurality of computers. In this case, for example, the computers may respectively function as one of the learning model generation unit 11, the image acquisition unit 12, the specification unit 13 and the vegetation index calculation unit 14.

Second Example Embodiment

Next, a vegetation index calculation apparatus, a vegetation index calculation method and a program in a second example embodiment of the invention will be described, with reference to FIGS. 7 and 8.

(Apparatus Configuration)

Initially, the configuration of the vegetation index calculation apparatus in the second example embodiment will be described using FIG. 7. FIG. 7 is a block diagram showing the configuration of the vegetation index calculation apparatus in the second example embodiment of the invention.

Figure 7:
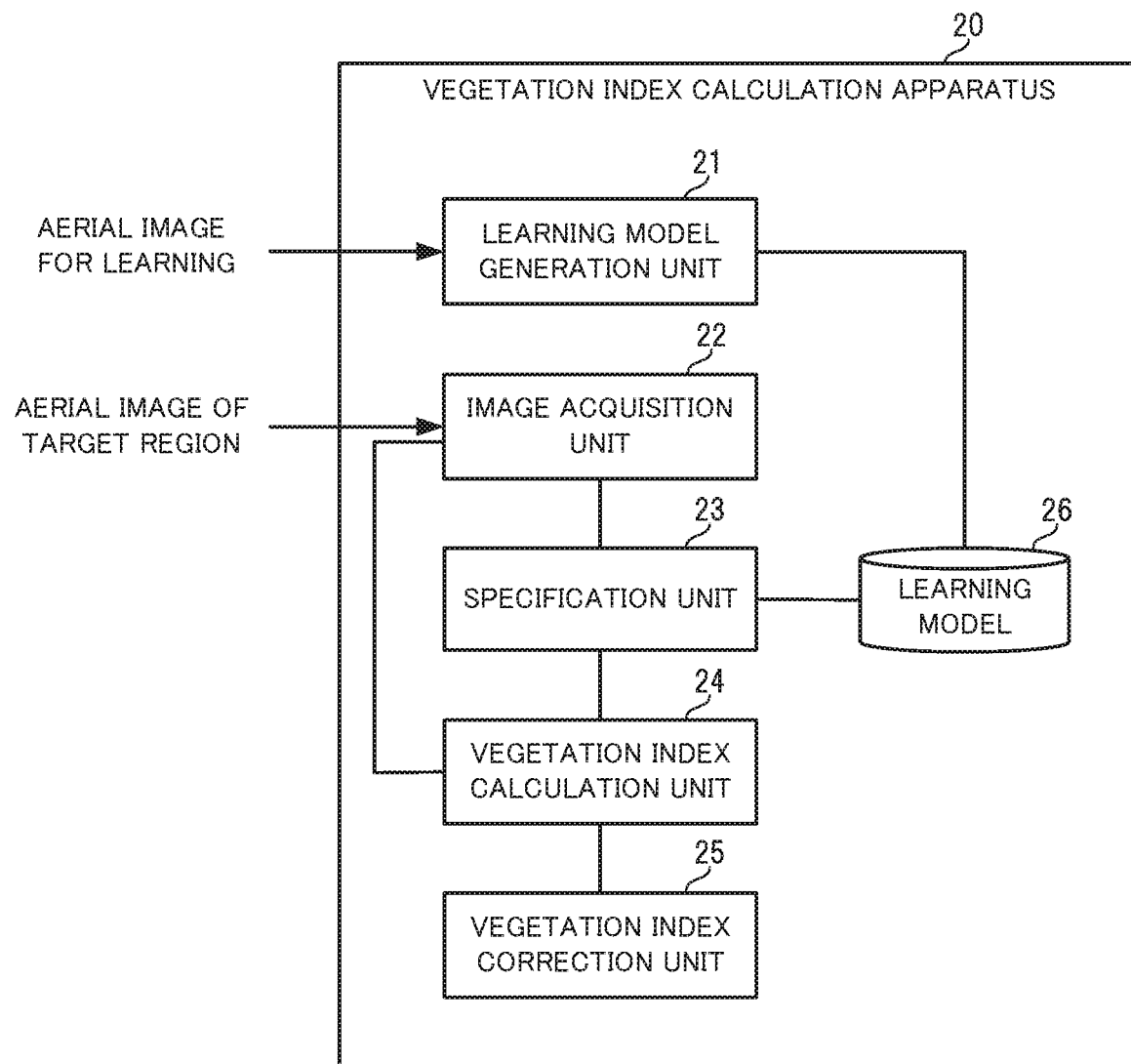
FIG. 7 is a block diagram showing the configuration of a vegetation index calculation apparatus in a second example embodiment of the invention.

As shown in FIG. 7, in the second example embodiment, a vegetation index calculation apparatus 20 is provided with a learning model generation unit 21, an image acquisition unit 22, a specification unit 23 and a vegetation index calculation unit 24, similarly to the vegetation index calculation apparatus 10 in the first example embodiment. In the second example embodiment, the vegetation index calculation unit 20 is, however, provided with a vegetation index correction unit 25, and differs from the vegetation index calculation apparatus 10 in the first example embodiment in this regard. Hereinafter, the second example embodiment will be described focusing on the differences from the first example embodiment.

The learning model generation unit 21 learns feature amounts of images of plants other than the crop in the second example embodiment. Hereinafter, description will be given, using weeds as an example of the plants other than the crop. The learning model generation unit 21 learns feature amounts of the images of the weeds that exist in a target field or area, and generates a learning model 26 that can specify images of these weeds. Also, the specification unit 23, in the second example embodiment, specifies images of the weeds in a target field or area, by applying an aerial image of that field or area to the learning model 26.

The vegetation index calculation unit 24 then calculates a first vegetation index (vegetation index of plants (including the crop) that exists in the target field or area) using an entire aerial image of the target field or area acquired by the image acquisition unit 22, and, furthermore, calculates a second vegetation index (vegetation index of weeds) using an image of the weeds specified by the specification unit 23.

The vegetation index correction unit 25 calculates a vegetation index of the crop targeted for calculation of a vegetation index, by correcting the first vegetation index calculated from the entire aerial image of the target field or area, using the second vegetation index (vegetation index of weeds).

(Apparatus Operations)

Next, operations of the vegetation index calculation apparatus 20 in the second example embodiment of the invention will be described using FIG. 8. FIG. 8 is a flowchart showing operations at the time of vegetation index calculation processing by the vegetation index calculation apparatus in the second example embodiment of the invention. Also, in the second example embodiment, a vegetation index calculation method is implemented by operating the vegetation index calculation apparatus 20. Therefore, description of the vegetation index calculation method in the second example embodiment will be replaced by the following description of the operations of the vegetation index calculation apparatus.

First, in the second example embodiment, similarly to the first example embodiment, the learning model generation unit 21 generates a learning model according to steps A1 to A4 shown in FIG. 4 or steps B1 to B3 shown in FIG. 5. Since the learning model that is generated, however, is for specifying an image of weeds, the learning model generation unit 21, in step A4 shown in FIG. 4, learns feature amounts indicating shape, color and position of the region where the weeds exist, using a support vector machine.

Figure 8:
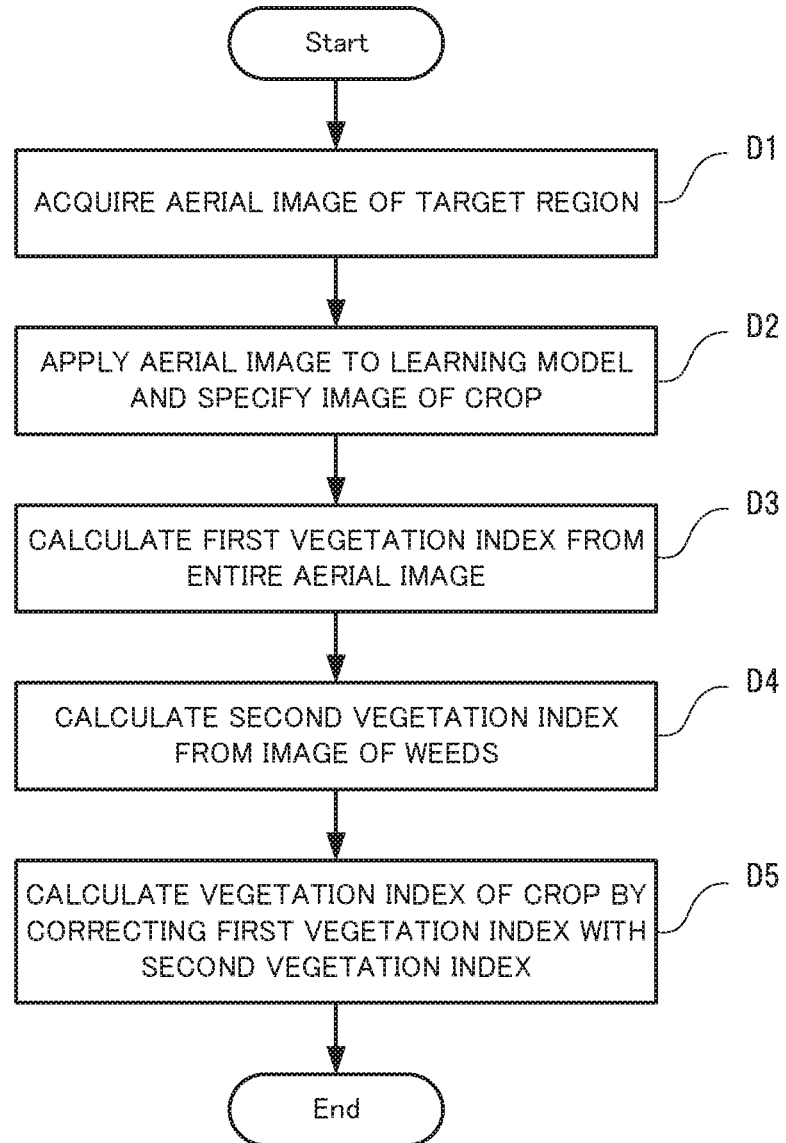
FIG. 8 is a flowchart showing operations at the time of vegetation index calculation processing of the vegetation index calculation apparatus in the second example embodiment of the invention.

As shown in FIG. 8, initially, the image acquisition unit 22 acquires an aerial image of the target region where the crop is being grown (step D1).

Next, the specification unit 23 applies the aerial image acquired by the image acquisition unit 22 in step D1 to the learning model 26, and specifies an image of the weeds in this aerial image (step D2).

Next, the vegetation index calculation unit 24 calculates a first vegetation index (vegetation index of plants (including the crop) that exist in the target field or area), using the entire aerial image acquired by the image acquisition unit 22 in step D1 (step D3).

Next, the vegetation index calculation unit 24 calculates a second vegetation index (vegetation index of weeds) using the image of the weeds specified by the specification unit 23 in step D2 (step D4).

Next, the vegetation index correction unit 25 calculates a vegetation index of the crop, by correcting the first vegetation index calculated by the vegetation index calculation unit 24 in step D3, using the second vegetation index calculated by the vegetation index calculation unit 24 in step D4 (step D5). Also, the vegetation index correction unit 25 transmits the calculated vegetation index to an external terminal unit or the like.

Thus, in the second example embodiment, the vegetation index of the crop is calculated by correcting the first vegetation index calculated from an entire aerial image of the target field or area, using the second vegetation index (vegetation index of weeds), thus enabling the calculation accuracy of the vegetation index of the crop to be enhanced.

(Program)

The program in the second example embodiment need only be a program that causes a computer to execute steps A1 to A4 shown in FIG. 4 (or steps B1 to B3 shown in FIG. 5) and steps D1 to D5 shown in FIG. 8. The vegetation index calculation apparatus 20 and the vegetation index calculation method in the second example embodiment can be realized, by this program being installed on a computer and executed. In this case, a processor of the computer function and performs processing as the learning model generation unit 21, the image acquisition unit 22, the specification unit 23, the vegetation index calculation unit 24 and the vegetation index correction unit 25.

Also, the program in the second example embodiment may be executed by a computer system built with a plurality of computers. In this case, for example, the computers may respectively function as one of the learning model generation unit 21, the image acquisition unit 22, the specification unit 23, the vegetation index calculation unit 24 and the vegetation index correction unit 25.

(Physical Configuration)

Figure 9:
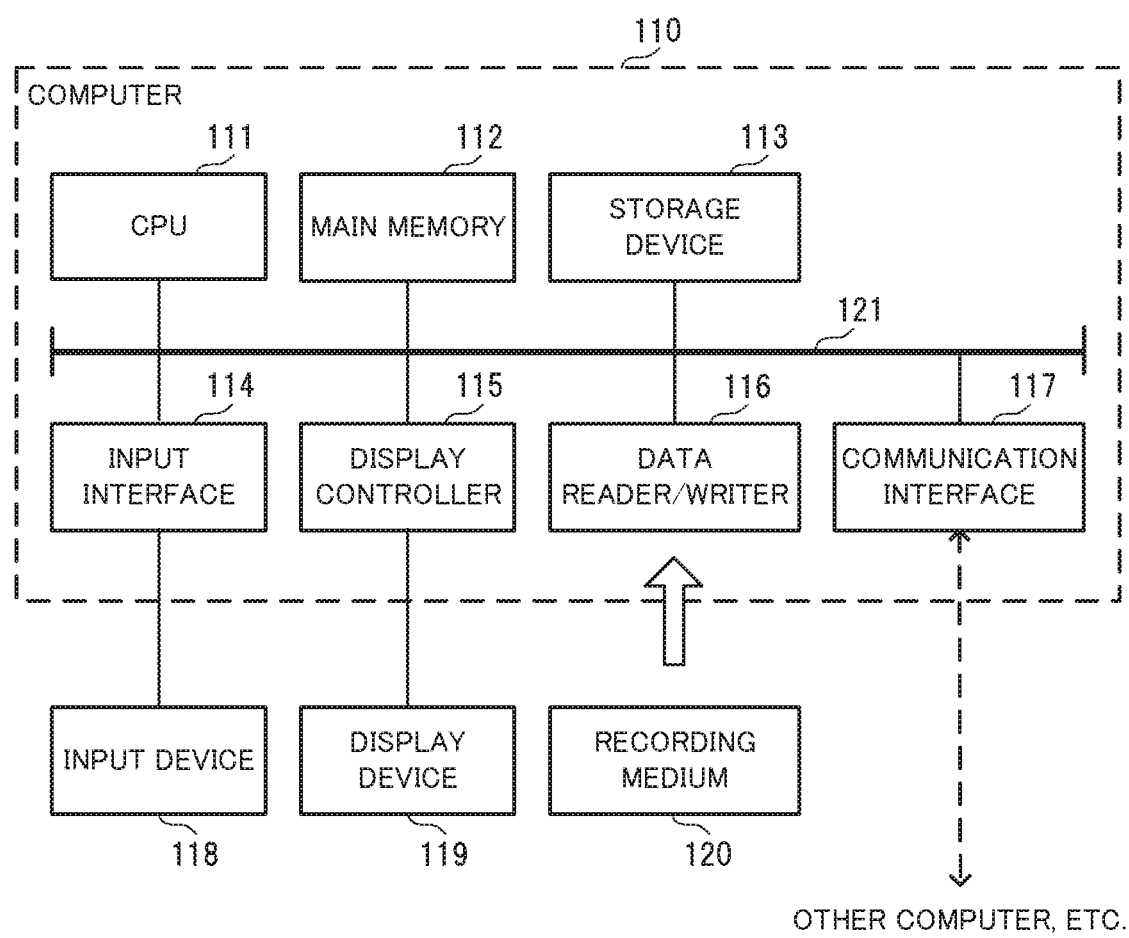
FIG. 9 is a block diagram showing an example of a computer that realizes the vegetation index calculation apparatus in the first and second example embodiments of the invention.

Here, a computer that realizes the vegetation index calculation apparatus 10 by executing a program in the first and second example embodiments will be described using FIG. 9. FIG. 9 is a block diagram showing an example of a computer that realizes the vegetation index calculation apparatus in the first and second example embodiments of the invention.

As shown in FIG. 9, a computer 110 is provided with a CPU (Central Processing Unit) 111, a main memory 112, a storage device 113, an input interface 114, a display controller 115, a data reader/writer 116, and a communication interface 117. These units are connected to each other in a manner that enables data communication, via a bus 121. Note that the computer 110 may be provided with a GPU (Graphics Processing Unit) or a FPGA (Field-Programmable Gate Array) in addition to the CPU 111 or instead of the CPU 111.

The CPU 111 implements various computations, by extracting programs (code) of the example embodiments stored in the storage device 113 to the main memory 112, and executing these programs in a predetermined order. The main memory 112 is, typically, a volatile storage device such as a DRAM (Dynamic Random Access Memory). Also, the programs of the example embodiments can be provided in a state of being stored on a computer readable recording medium 120. Note that the programs of the example embodiments may also be distributed on the Internet connected via the communication interface 117.

Also, a semiconductor memory device such as a flash memory is given as a specific example of the storage device 113, in addition to a hard disk drive. The input interface 114 mediates data transmission between the CPU 111 and an input device 118 such a keyboard and a mouse. The display controller 115 is connected to a display device 119, and controls display that is performed on the display device 119.

The data reader/writer 116 mediates data transmission between the CPU 111 and the recording medium 120, and executes reading out of programs from the recording medium 120, and writing of processing results of the computer 110 to the recording medium 120. The communication interface 117 mediates data transmission between the CPU 111 and other computers.

Also, a general-purpose semiconductor memory such as CF (Compact Flash (registered trademark)) and SD (Secure Digital), a magnetic recording medium such a flexible disk, or an optical recording medium such as CD-ROM (Compact Disk Read Only Memory) are given as specific examples of the recording medium 120.

Note that the vegetation index calculation apparatus 10 in the example embodiments is also realizable by using hardware that supports the various components, rather than a computer on which programs are installed. Furthermore, the vegetation index calculation apparatus 10 may be partly realized by programs, and the remaining portion may be realized by hardware.

The above example embodiments can also be partly or wholly represented by Supplementary Notes 1 to 12 described below, but are not limited to the following disclosure.

(Supplementary Note 1)
A vegetation index calculation apparatus including: a learning model generation unit configured to generate a learning model, by using an image of a crop targeted for calculation of a vegetation index and an image of plants other than the crop to learn a feature amount of the image of the crop;
an image acquisition unit configured to acquire an aerial image of a target region where the crop is being grown;
a specification unit configured to apply the aerial image acquired by the image acquisition unit to the learning model generated by the learning model generation unit, and specify the image of the crop in the aerial image acquired by the image acquisition unit; and
a vegetation index calculation unit configured to calculate the vegetation index of the crop, using the image of the crop specified by the specification unit.

(Supplementary Note 2)
The vegetation index calculation apparatus according to Supplementary Note 1, in which the learning model generation unit extracts feature amounts indicating shape, color and position in each of a region where the crop exists and a region where the plants other than the crop exist from an aerial image for learning, learns the feature amounts indicating shape, color and position of the region where the crop exists using a support vector machine, and generates a learning model indicating a result of the learning.

(Supplementary Note 3)
The vegetation index calculation apparatus according to Supplementary Note 1, in which the learning model generation unit creates, by deep learning, a classifier that identifies an image of the crop taken from the sky and an image of the plants other than the crop taken from the sky from an aerial image for learning, and sets the created classifier as the learning model.

(Supplementary Note 4)
A vegetation index calculation apparatus including:
a learning model generation unit configured to generate a learning model, by using an image of a crop targeted for calculation of a vegetation index and an image of plants other than the crop to learn a feature amount of the image of the plants other than the crop;
an image acquisition unit configured to acquire an aerial image of a target region where the crop is being grown;
a specification unit configured to apply the aerial image acquired by the image acquisition unit to the learning model generated by the learning model generation unit, and specify the image of the plants other than the crop in the aerial image acquired by the image acquisition unit;
a vegetation index calculation unit configured to calculate a first vegetation index using the aerial image, and calculate a second vegetation index using the image of the plants other than the crop specified by the specification unit; and
a vegetation index correction unit configured to calculate the vegetation index of the crop, by correcting the first vegetation index with the second vegetation index.

(Supplementary Note 5)
A vegetation index calculation method including:
(a) a step of generating a learning model, by using an image of a crop targeted for calculation of a vegetation index and an image of plants other than the crop to learn a feature amount of the image of the crop;
(b) a step of acquiring an aerial image of a target region where the crop is being grown;
(c) a step of applying the aerial image acquired in the (b) step to the learning model generated in the (a) step, and specifying the image of the crop in the aerial image acquired in the (b) step; and
(d) a step of calculating the vegetation index of the crop, using the image of the crop specified in the (c) step.

(Supplementary Note 6)
The vegetation index calculation method according to Supplementary Note 5, in which, in the (a) step, feature amounts indicating shape, color and position in each of a region where the crop exists and a region where the plants other than the crop exist are extracted from an aerial image for learning, the feature amounts indicating shape, color and position of the region where the crop exists are learned using a support vector machine, and a learning model indicating a result of the learning is generated.

(Supplementary Note 7)
The vegetation index calculation method according to Supplementary Note 5, in which, in the (a) step, a classifier that identifies an image of the crop taken from the sky and an image of the plants other than the crop taken from the sky is created, by deep learning, from an aerial image for learning, and the created classifier is set as the learning model.

(Supplementary Note 8)

A vegetation index calculation method including:

(a) a step of generating a learning model, by using an image of a crop targeted for calculation of a vegetation index and an image of plants other than the crop to learn a feature amount of the image of the plants other than the crop;

(b) a step of acquiring an aerial image of a target region where the crop is being grown;

(c) a step of applying the aerial image acquired in the (b) step to the learning model generated in the (a) step, and specifying the image of the plants other than the crop in the aerial image acquired in the (b) step;

(d) a step of calculating a first vegetation index using the aerial image, and calculating a second vegetation index using the image of the plants other than the crop specified in the (c) step; and (e) a step of calculating the vegetation index of the crop, by correcting the first vegetation index with the second vegetation index.

(Supplementary Note 9)

A computer readable recording medium that includes a program recorded thereon, the program including instructions that cause a computer to carry out:

(a) a step of generating a learning model, by using an image of a crop targeted for calculation of a vegetation index and an image of plants other than the crop to learn a feature amount of the image of the crop;

(b) a step of acquiring an aerial image of a target region where the crop is being grown;

(c) a step of applying the aerial image acquired in the (b) step to the learning model generated in the (a) step, and specifying the image of the crop in the aerial image acquired in the (b) step; and (d) a step of calculating the vegetation index of the crop, using the image of the crop specified in the (c) step.

(Supplementary Note 10)

The computer readable recording medium according to Supplementary Note 9, in which, in the (a) step, feature amounts indicating shape, color and position in each of a region where the crop exists and a region where the plants other than the crop exist are extracted from an aerial image for learning, the feature amounts indicating shape, color and position of the region where the crop exists are learned using a support vector machine, and a learning model indicating a result of the learning is generated.

(Supplementary Note 11)

The computer readable recording medium according to Supplementary Note 9, in which, in the (a) step, a classifier that identifies an image of the crop taken from the sky and an image of the plants other than the crop taken from the sky is created, by deep learning, from an aerial image for learning, and the created classifier is set as the learning model.

(Supplementary Note 12)

A computer readable recording medium that includes a program recorded thereon, the program including instructions that cause a computer to carry out:

(a) a step of generating a learning model, by using an image of a crop targeted for calculation of a vegetation index and an image of plants other than the crop to learn a feature amount of the image of the plants other than the crop;

(b) a step of acquiring an aerial image of a target region where the crop is being grown;

(c) a step of applying the aerial image acquired in the (b) step to the learning model generated in the (a) step, and specifying the image of the plants other than the crop in the aerial image acquired in the (b) step;

(d) a step of calculating a first vegetation index using the aerial image, and calculating a second vegetation index using the image of the plants other than the crop specified in the (c) step; and (e) a step of calculating the vegetation index of the crop, by correcting the first vegetation index with the second vegetation index.

Although the invention has been described above with reference to example embodiments, the invention is not intended to be limited to the above example embodiments. A person skilled in the art will appreciate that the configurations and details of the invention can be variously modified within the scope of the invention.

This application is based upon and claims the benefit of priority from Japanese application No. 2017-57781 filed in Japan on Mar. 23, 2017, the disclosure of which is incorporated herein in its entirely.

INDUSTRIAL APPLICABILITY

As described above, according to the invention, a vegetation index of a targeted crop can be accurately calculated in a specific field or area. The invention is useful in a system that performs prediction of crop yields, which requires accurate vegetation index values.

LIST OF REFERENCE SIGNS

10 Vegetation index calculation apparatus (first example embodiment)
11 Learning model generation unit
12 Image acquisition unit
13 Specification unit
14 Vegetation index calculation unit
15 Learning model
20 Vegetation index calculation apparatus (second example embodiment)
21 Learning model generation unit
22 Image acquisition unit
23 Specification unit
24 Vegetation index calculation unit
25 Vegetation index correction unit
26 Learning model
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A vegetation index calculation apparatus comprising:
a learning model generation unit configured to generate a learning model, by using an image of a crop targeted for calculation of a vegetation index and an image of plants other than the crop to learn a feature amount of the image of the crop, wherein plants other than the crop are weeds;

an image acquisition unit configured to acquire an aerial image of a target region where the crop is being grown;

a specification unit configured to apply the aerial image acquired by the image acquisition unit to the learning model generated by the learning model generation unit, and specify the image of the crop in the aerial image acquired by the image acquisition unit; and a vegetation index calculation unit configured to calculate the vegetation index of the crop, using the image of the crop specified by the specification unit.

2. The vegetation index calculation apparatus according to claim 1, wherein the learning model generation unit extracts feature amounts indicating shape, color and position in each of a region where the crop exists and a region where the plants other than the crop exist from an aerial image for learning, learns the feature amounts indicating shape, color and position of the region where the crop exists using a support vector machine, and generates a learning model indicating a result of the learning.

3. The vegetation index calculation apparatus according to claim 1, wherein the learning model generation unit creates, by deep learning, a classifier that identifies an image of the crop taken from the sky and an image of the plants other than the crop taken from the sky from an aerial image for learning, and sets the created classifier as the learning model.

4. The vegetation index calculation apparatus according to claim 1, wherein the specification unit applies the aerial image acquired by the image acquisition unit to the learning model generated by the learning model generation unit, and specifies the image of the plants other than the crop in the aerial image acquired by the image acquisition unit;

the vegetation index calculation unit calculates a first vegetation index using the aerial image, and calculate a second vegetation index using the image of the plants other than the crop specified by the specification unit; and a vegetation index correction unit configured to calculate the vegetation index of the crop, by correcting the first vegetation index with the second vegetation index.

5. A vegetation index calculation method comprising:
(a) generating a learning model, by using an image of a crop targeted for calculation of a vegetation index and an image of plants other than the crop to learn a feature amount of the image of the crop, wherein plants other than the crop are weeds;
(b) acquiring an aerial image of a target region where the crop is being grown;
(c) applying the aerial image of the target region to the generated learning model, and specifying the image of the crop in the aerial image; and (d) calculating the vegetation index of the crop, using the image of the crop specified in the aerial image of the crop.

6. The vegetation index calculation method according to claim 5, wherein, in (a), feature amounts indicating shape, color and position in each of a region where the crop exists and a region where the plants other than the crop exist are extracted from an aerial image for learning, the feature amounts indicating shape, color and position of the region where the crop exists are learned using a support vector machine, and a learning model indicating a result of the learning is generated.

7. The vegetation index calculation method according to claim 5, wherein, in (a), a classifier that identifies an image of the crop taken from the sky and an image of the plants other than the crop taken from the sky is created, by deep learning, from an aerial image for learning, and the created classifier is set as the learning model.

8. A non-transitory computer readable recording medium that includes a program recorded thereon, the program including instructions that cause a computer to carry out:
(a) a step of generating a learning model, by using an image of a crop targeted for calculation of a vegetation index and an image of plants other than the crop to learn a feature amount of the image of the crop, wherein plants other than the crop are weeds;
(b) a step of acquiring an aerial image of a target region where the crop is being grown;
(c) a step of applying the aerial image acquired in the (b) step to the learning model generated in the (a) step, and specifying the image of the crop in the aerial image acquired in the (b) step; and
(d) a step of calculating the vegetation index of the crop, using the image of the crop specified in the (c) step.

9. The non-transitory computer readable recording medium according to claim 8, wherein, in the (a) step, feature amounts indicating shape, color and position in each of a region where the crop exists and a region where the plants other than the crop exist are extracted from an aerial image for learning, the feature amounts indicating shape, color and position of the region where the crop exists are learned using a support vector machine, and a learning model indicating a result of the learning is generated.

10. The non-transitory computer readable recording medium according to claim 8, wherein, in the (a) step, a classifier that identifies an image of the crop taken from the sky and an image of the plants other than the crop taken from the sky is created, by deep learning, from an aerial image for learning, and the created classifier is set as the learning model.

* * * * *